D. A. SCHUTT.
GRAIN DRILL.
APPLICATION FILED NOV. 24, 1911.
1,021,379.
Patented Mar. 26, 1912.
2 SHEETS—SHEET 1.
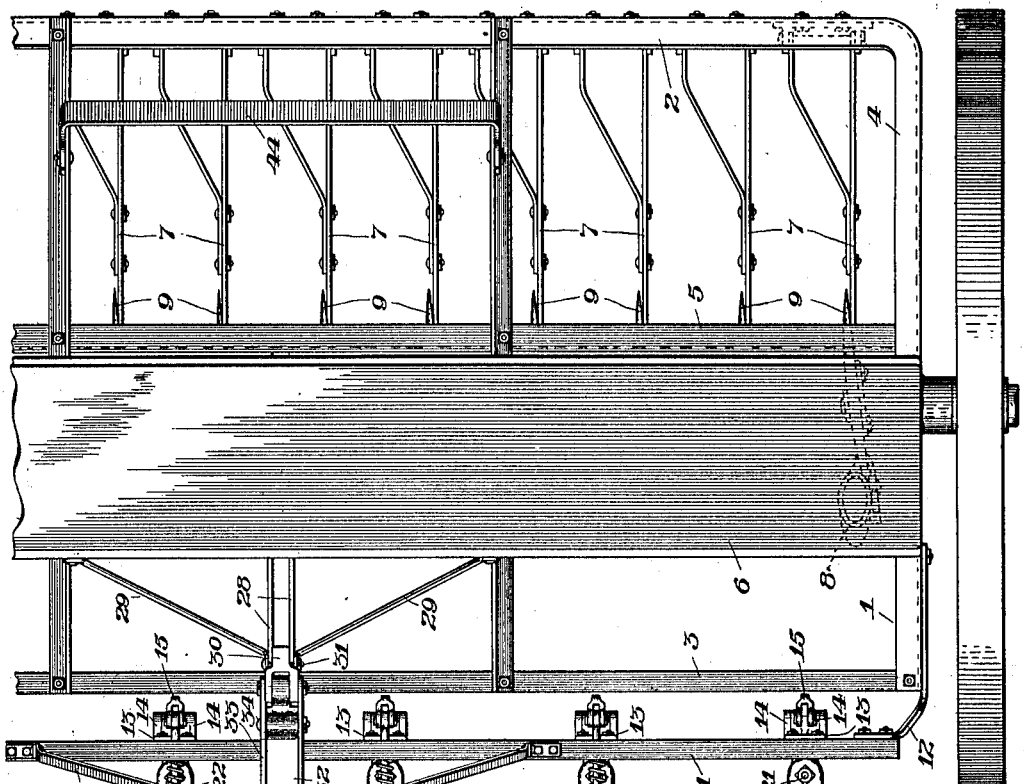
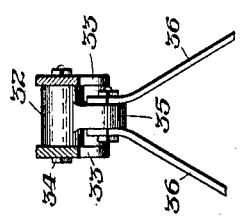
Witnesses
F. W. Hofmeister
C. C. Palmer
Inventor
Duny A. Schutt
By E. W. Burgess
Attorney D. A. SCHUTT.
GRAIN DRILL.
APPLICATION FILED NOV. 24, 1911.
1,021,379.
Patented Mar. 26, 1912.
2 SHEETS—SHEET 2.
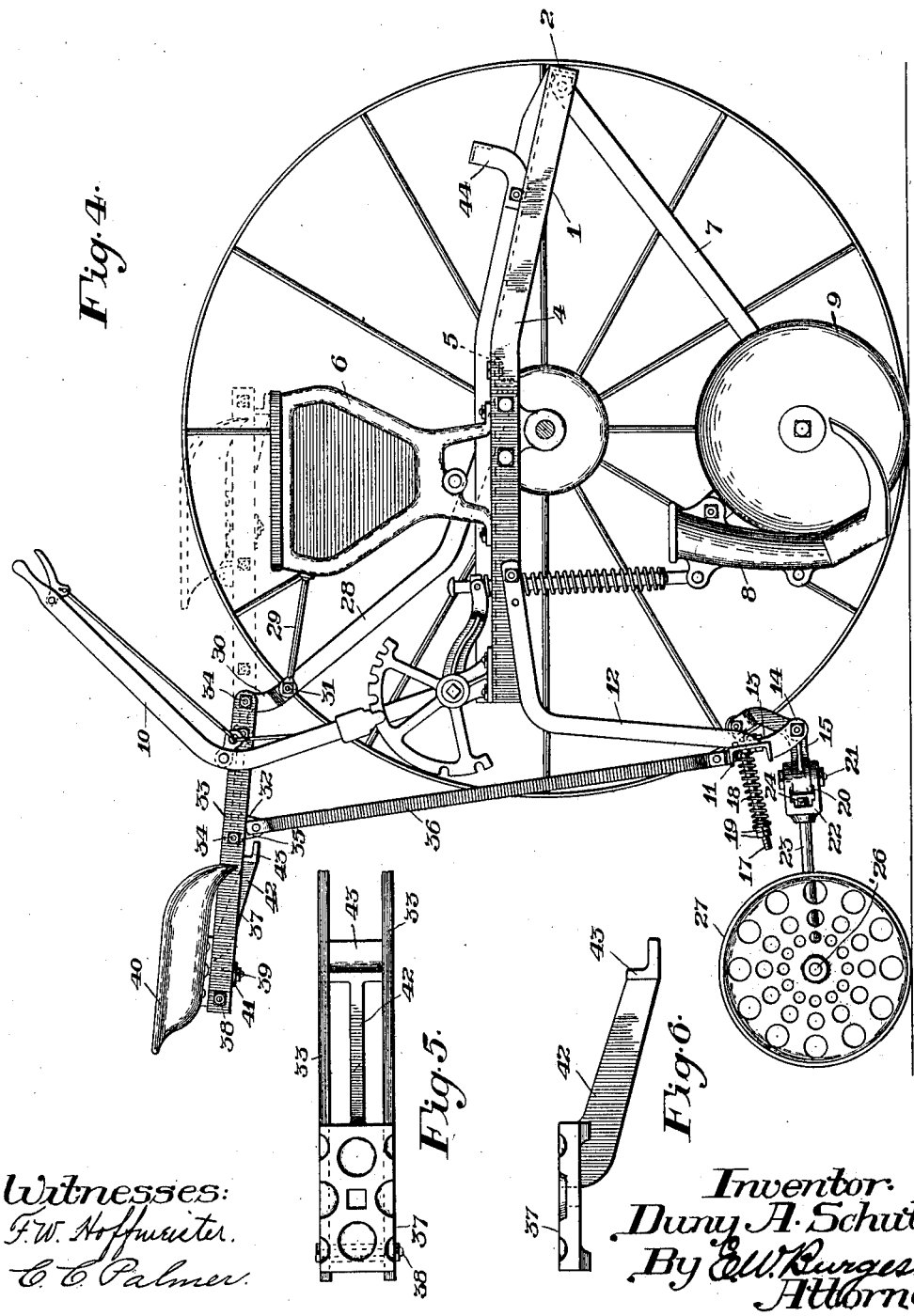

UNITED STATES PATENT OFFICE.

DUNY A. SCHUTT, OF CHICAGO, ILLINOIS, ASSIGNOR TO INTERNATIONAL HARVESTER COMPANY, A CORPORATION OF NEW JERSEY.

GRAIN-DRILL.

1,021,379. Specification of Letters Patent. Patented Mar. 26, 1912.

Application filed November 24, 1911. Serial No. 662,089.

*To all whom it may concern:*

Be it known that I, DUNY A. SCHUTT, a citizen of the United States, residing at Chicago, in the county of Cook and State of Illinois, have invented certain new and useful Improvements in Grain-Drills, of which the following is a specification.

My invention relates to grain drills, and in particular to an improved form of presser wheel attachment designed to trail in rear of the furrow openers and operative in the path of the latter in a manner to press the soil in close contact with the seed as it is delivered from the seed tubes, and includes a supporting frame having draft bars connecting the said frame with the wheeled frame of the grain drill in a manner permitting the supporting frame to rise and fall relative to the wheeled frame, a series of rearwardly projecting arms having the front ends thereof connected with the supporting frame by means of universal coupling members, and pressure spring mechanism, the rear ends of said arms being connected with axle members upon which are journaled the presser wheels, and an operator's seat connected with the grain drill and the supporting frame in a manner whereby the weight of the operator is carried by the presser wheels; the object of my invention being to provide a presser wheel attachment for grain drills that is strong in its construction, readily attached to or detached from the wheeled frame of the grain drill, comprising few parts and flexible in its operation, whereby it may follow any uneven conditions of the surface over which it may travel. These objects are attained by means of the mechanism illustrated by the accompanying drawings, in which—

Figure 1 represents a top plan view of part of a grain drill mechanism having my improved presser wheel attachment connected therewith; Fig. 2 represents a detached detail of the presser wheel mechanism designed to illustrate the manner of connecting the wheel supporting arms with the frame of the attachment; Fig. 3 is a detached detail, partly in section, designed to illustrate the manner of connecting the seat supporting member with the frame of the presser wheel attachment; Fig. 4 represents a side elevation of Fig. 1; Fig. 5 represents a top plan view of a detail part of the seat supporting mechanism; and Fig. 6 represents a side elevation of part of Fig. 5.

The same reference characters designate like parts throughout the several views.

1 represents the wheeled frame of a grain drill, including transverse front and rear sill members 2 and 3, respectively, and end sill members 4 at opposite sides of the machine, and 5 represents a transverse member of said frame arranged intermediate the front and rear sill members; 6 represents a grain hopper mounted upon the wheeled frame, 7 drag bars having their front ends pivotally connected with the front sill member and the rear ends thereof secured to grain delivering boots 8; 9 represents furrow opening disks journaled upon the drag bars in advance of the boots, and 10 a common form of lever controlling spring pressure mechanism connected with the seed delivery mechanism in a manner to yieldingly press the openers toward the ground.

The presser wheel attachment comprises a transversely arranged draft frame member 11 having opposite ends thereof secured to the lower ends of upwardly and forwardly curved draft links 12, the front ends of said links being pivotally connected with the end sill members 4 in a manner permitting a rising and falling movement of draft frame member 11.

13 represents depending brackets secured to the frame member 11 in spaced relation, and provided with ear members 14 spaced apart in a manner to receive double armed rocking levers 15 that are received by transverse openings in the ear members. The front ends of the levers are curved upward, and 17 represents links slidably received by openings in the draft frame member 11, having their front ends pivotally connected with the upturned ends of said levers, and 18 represents compression springs encircling the links and operative between the rear side of member 11 and adjusting nuts 19 at the rear ends of the links in a manner to yieldingly draw the upturned ends of the levers toward member 11. The rear ends of the levers 15 are provided with cylindrical portions 20, having vertical openings therein that receive pivot bolts 21 that connect the levers with clevis members 22 in a manner permitting a limited lateral swinging movement of the rear ends of said clevis members about the axis thereof. The rear ends of the clevis members are provided with openings arranged in the direction of the line of draft that loosely receive the front ends of draft rods 23 that are held therein by pins 24 in a manner permitting the rods to turn about their axes. The rear ends of the rods are secured to T-shaped blocks 25 that are provided with transverse openings adapted to receive axle members 26, and 27 represents presser wheels journaled upon opposite ends of said axle members and spaced apart in a manner to follow in the path of the furrow openers.

28 represents seat supporting members having their lower front ends secured to member 5 of the wheel frame of the grain drill and extending rearward below the grain hopper, are curved upward in rear thereof and connected therewith by means of laterally inclined brace members 29.

30 represents a hinge member secured to the upturned ends of members 28 and connected, by means of a cross pin 31, with a hinge plate member 32 that is received between two seat supporting bars 33 that are secured to said plate member by means of bolts 34, and having the ends adjacent said cross pin provided with openings that receive said pin in a manner whereby said seat supporting bar may be turned in a vertical plane to said hinge connection.

35 represents a depending ear integral with plate member 32 at its opposite end, to which is secured the upper ends of bars 36, said bars inclining downward and laterally and having their lower ends secured to the draft frame member 11 of the presser wheel mechanism.

37 represents a seat supporting member that is adapted to be received between the opposite ends of the seat supporting bars 33, and secured in place by means of a clamping bolt 38 that is supplemented by means of a bolt 39 received by an opening in the bottom of an operator's seat 40, and passed through an opening in a cross slip 41 engaging with the opposite edges of the bars 33. The seat supporting member 37 is provided with a longitudinally extending arm 42, having a toe member 43.

When the presser wheel attachment is connected with the grain drill, the seat supporting bars and seat are in the position shown in full lines in Fig. 4, and the weight of the operator will bear directly upon the draft frame member 11, each pair of presser wheels being independently controlled in a rising and falling movement by means of the spring mechanism connected with the rocking levers 15, and an axial movement of the draft rods 23 permits either wheel of a pair to rise or fall independent of its companion in passing over an obstruction, the draft connection permitting a free swinging movement laterally of each pair of wheels during a turning movement of the grain drill.

When the presser wheel attachment is disconnected from the grain drill, the seat support is turned upward and forward, the seat supporting member 37 is released from its securing means and placed in a reverse position between the bars 33, having the toe member thereof resting upon the top of the grain hopper and the seat turned to the position shown by dotted lines in Fig. 4, and 44 represents a foot member secured to the wheeled frame of the grain drill.

What I claim as my invention, and desire to secure by Letters Patent, is:

1. A grain drill including, in combination, a wheeled frame, furrow openers, seed delivery mechanism, and presser wheel mechanism including a transversely arranged draft member having opposite ends thereof flexibly connected with said wheeled frame in a manner permitting a rising and falling movement of said draft member relative to said wheeled frame, a series of bracket members secured to said draft member in spaced relation, double armed rocking levers pivotally connected with said brackets, a series of axle members, presser wheels journaled upon said axle members, draft rods connecting said axle members with one end of said rocking levers in a manner permitting a lateral swinging movement of said axle members and a turning movement of said draft rods about their axes.

2. A grain drill including, in combination, a wheeled frame, furrow openers, seed delivery mechanism, and presser wheel mechanism including a transversely arranged draft member having opposite ends thereof flexibly connected with said wheeled frame in a manner permitting a rising and falling movement of said draft member relative to said wheeled frame, a series of bracket members secured to said draft member in spaced relation, double armed rocking levers pivotally connected with said brackets, a series of axle members, presser wheels journaled upon opposite ends of said axle members, clevis members connected with one end of said rocking levers by means of vertically arranged pins whereby said clevis members are permitted to swing laterally, draft rods having one end thereof connected with said axle members and their opposite ends with said clevis members in a manner permitting said rods to turn axially.

3. A grain drill including, in combination, a wheeled frame, furrow openers, seed delivery mechanism, and presser wheel mechanism including a transversely arranged draft member having opposite ends thereof flexibly connected with said wheeled frame in a manner permitting a rising and falling movement of said draft member relative to said wheeled frame, a series of bracket members secured to said draft member in spaced relation, double armed rocking levers pivotally connected with said brackets, a series of axle members, presser wheels journaled upon opposite ends of said axle members, clevis members connected with one end of said rocking levers by means of vertically arranged pins whereby said clevis members are permitted to swing laterally, draft rods having one end thereof connected with said axle members, and their opposite ends with said clevis members in a manner permitting said rods to turn axially, links pivotally connected with the opposite ends of said rocking levers and slidably received by openings in said draft member, and compression springs encircling said links and operative in a manner to rock said levers in one direction.

4. A grain drill including, in combination, a wheeled frame, a seed hopper arranged upon said wheeled frame, furrow openers, seed delivery mechanism, and presser wheel mechanism including a transversely arranged draft member having opposite ends thereof flexibly connected with said wheeled frame in a manner permitting a rising and falling movement of said draft member relative to said wheeled frame, seat supporting members having their lower ends secured to said wheeled frame and their upper ends connected with said seed hopper by means of laterally extending brace members, seat supporting bars pivotally connected with the upper ends of said seat supporting members in a manner permitting a swinging movement thereof in a vertical plane, a reversible seat supporting plate adapted to be received between said seat supporting bars, means whereby said plate may be secured in either position, and weight sustaining bars connecting said seat supporting bars with said draft member.

DUNY A. SCHUTT.

Witnesses:
W. J. KLOCKZIEN,
H. A. McCREADIE.

Copies of this patent may be obtained for five cents each, by addressing the "Commissioner of Patents, Washington, D. C."